(12) United States Patent
Lopez

(10) Patent No.: US 6,670,865 B2
(45) Date of Patent: Dec. 30, 2003

(54) METHOD AND APPARATUS FOR LOW LOSS HIGH FREQUENCY TRANSMISSION

(76) Inventor: Noel A. Lopez, 4426 E. Dry Creek Rd., Phoenix, AZ (US) 85001-0086

(*) Notice: Subject to any disclaimer, the term of this patent is extended or adjusted under 35 U.S.C. 154(b) by 0 days.

(21) Appl. No.: 10/162,277

(22) Filed: Jun. 3, 2002

(65) Prior Publication Data
US 2002/0186090 A1 Dec. 12, 2002

Related U.S. Application Data

(60) Provisional application No. 60/296,387, filed on Jun. 6, 2001.

(51) Int. Cl.$^7$ ................................................ H03H 7/38
(52) U.S. Cl. .................. 333/33; 330/302; 330/252; 333/246; 333/247; 333/108
(58) Field of Search .................. 333/33, 116, 246, 333/128, 247, 109, 112, 133; 330/252, 277, 286, 302

(56) References Cited

U.S. PATENT DOCUMENTS

| | | | |
|---|---|---|---|
| 4,754,229 A | 6/1988 | Kawakami et al. | 330/277 |
| 4,849,722 A | 7/1989 | Cruchon et al. | 333/205 |
| 5,111,165 A | 5/1992 | Oldfield | 333/116 |
| 5,281,929 A | 1/1994 | Willems | 333/116 |
| 5,313,175 A | 5/1994 | Bahl et al. | 333/116 |
| 5,406,224 A | 4/1995 | Mikami et al. | 330/277 |
| 5,521,406 A * | 5/1996 | Tserng et al. | 333/247 |
| 5,760,650 A | 6/1998 | Faulkner et al. | 330/286 |
| 5,949,312 A * | 9/1999 | Buer et al. | 333/246 |
| 5,966,057 A | 10/1999 | Kintis et al. | 333/109 |
| 6,026,286 A | 2/2000 | Long | 455/327 |
| 6,064,265 A | 5/2000 | Yun et al. | 330/279 |
| 6,100,758 A | 8/2000 | Klemmer | 330/252 |
| 6,101,373 A | 8/2000 | Samuels | 455/115 |
| 6,118,072 A * | 9/2000 | Scott | 333/241 |
| 6,289,204 B1 | 9/2001 | Estes et al. | 455/78 |
| 6,331,807 B1 | 12/2001 | Prieto et al. | 333/128 |

* cited by examiner

Primary Examiner—Michael Tokar
Assistant Examiner—Lam T Mai
(74) Attorney, Agent, or Firm—Snell & Wilmer LLP; Patrick L. Mixon

(57) ABSTRACT

A high frequency receiver is provided with improved insertion loss and noise factor. The receiver uses a low loss input stage and interstage noise matching block. The input stage and interstage noise matching block utilize a suspended substrate matching circuit wherein the substrate is free space. The interstage noise matching block further uses a broadside suspended substrate coupler where the broadside coupler is suspended in a free space substrate. Singly and in combination, when used in a high frequency receiver arrangement, the suspended substrate input matching circuit and the suspended substrate interstage matching circuit with suspended substrate coupler minimize insertion loss and improve the high frequency receiver overall noise factor.

8 Claims, 5 Drawing Sheets

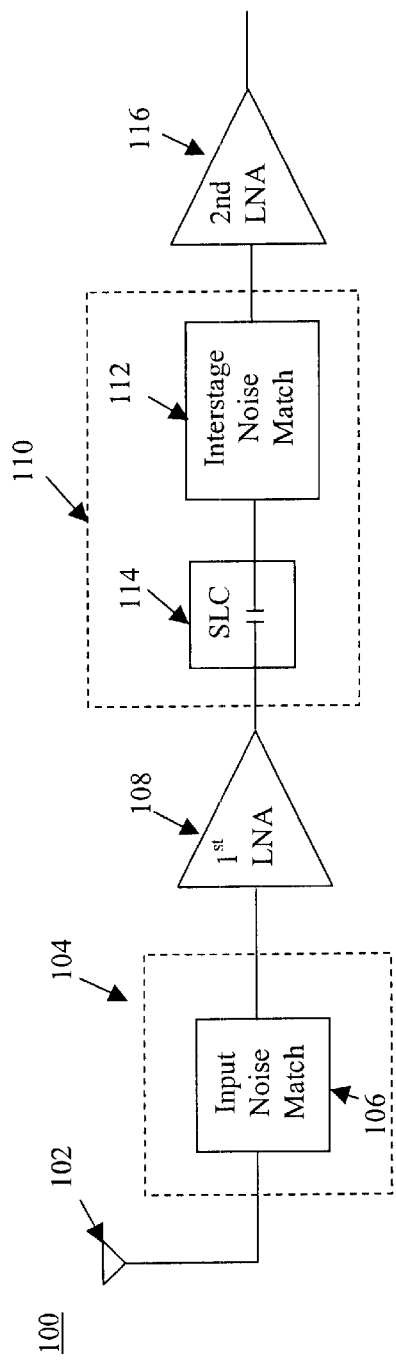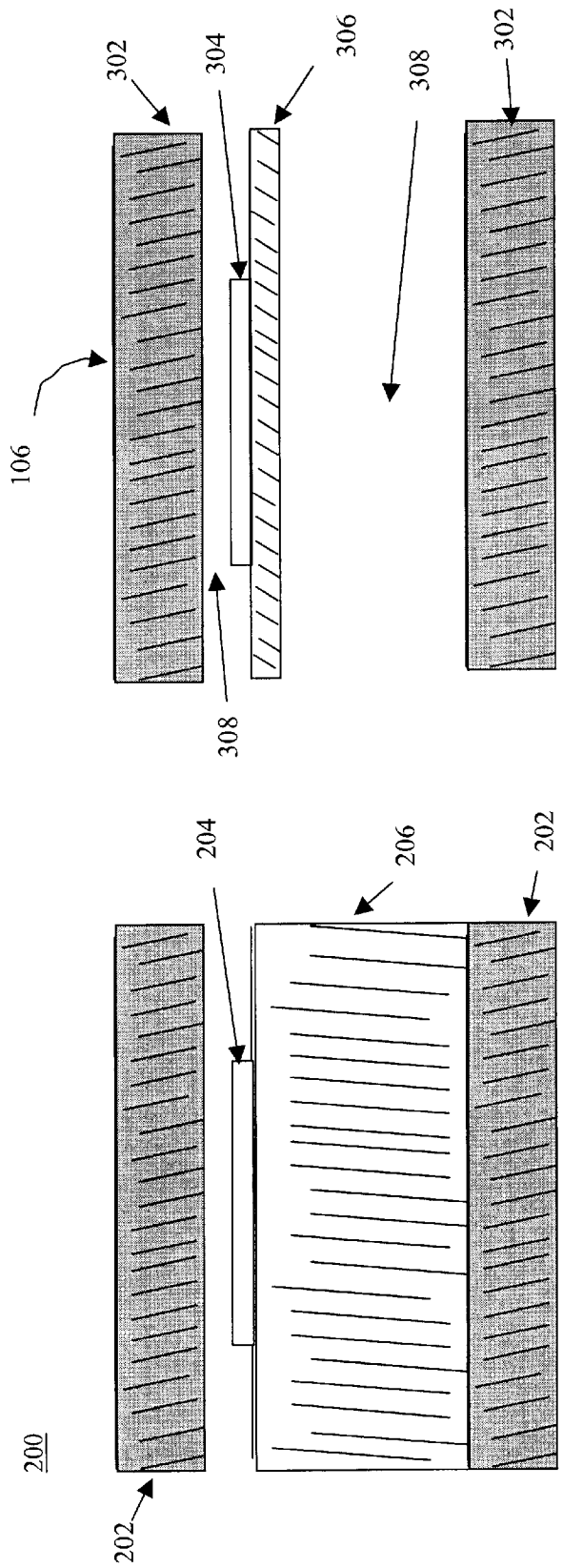

METHOD AND APPARATUS FOR LOW LOSS HIGH FREQUENCY TRANSMISSION

RELATED APPLICATIONS

This invention claims priority to U.S. Provisional Application No. 60/296,387, entitled "SUSPENDED STRIPLINE BROADSIDE COUPLER," filed on Jun. 6, 2001 and incorporated herein by reference.

FIELD OF INVENTION

This invention generally relates to an apparatus and method for a low loss low noise receiver for satellite transceivers and receivers.

BACKGROUND OF THE INVENTION

A radio signal receiver may typically include an amplifier chain having a filter stage and amplifier stages through which the received radio frequency signal is passed in series. The filters filter out unwanted (out of band) signals and noise and the amplifiers amplify the remaining signal. The resulting signal may then be passed to a mixer where it is downconverted, and subsequently demodulated.

The amplifiers used in receivers contribute to the noise attendant to the recovered signal. The noise added to the signal by the amplifier results in a degradation of the signal-to-noise (S/N) ratio at the output of the amplifier. A figure of merit for the amount of noise added by the amplifier is the ratio of the signal to noise ratio at the input $(S/N)_{IN}$ to the signal-to-noise ratio at the amplifier output $(S/N)_{out}$. This ratio is commonly referred to as the noise factor (F) of the amplifier, and is used to calculate the noise figure (NF) according to the formula $NF=\log_{10}(F)$, where $F=(S/N)_{IN}/(S/N)_{out}$. To cope with the extreme sensitivity of the high frequency signal the receiver must have a very low noise figure. Otherwise, the noise will tend to be amplified so that is overshadows the desired signal.

For high frequency operation, low noise amplifiers (LNAs) are often desired. LNAs are special amplifiers which are fabricated to produce less noise during operation. However, although the LNA contributes less noise, it contributes noise nonetheless. To optimize the performance from a LNA, the input to the LNA is typically noise matched prior to providing the signal to the LNA input for amplification.

In most receivers the first stage of the receiver is noise matched. Noise matching is typically performed in the first stage because the first stage dominates the noise performance of the entire receiver. Thus, by noise matching the first stage, each successive stage will contribute less noise than the previous stage. Noise matching the first stage is especially important in the high frequency receiver and transceiver systems (e.g., satellite receivers and transceivers.) In these receivers and transceivers systems, noise performance is critical since the signal received typically travels long distances and through many environmental media.

To noise match in conventional microwave receivers, microstrip or coplanar waveguides are often used. However, using microstrip or coplanar transmission lines are disadvantageous because the dielectric media in their construction causes significant insertion loss. That is, there is a significant loss in the strength (e.g., power) of the signal due to the loss tangent/dissipation factor of the substrate used in the microstrip or coplanar transmission line design. In particular, exemplary substrates which may be used in the microstrip or coplanar transmission design include, for example, Arlon 45N with a dissipation factor of 0.025 and Rogers 4003 with a dissipation factor of 0.003.

A typical receiver may also include a circuit element designed to couple a carrier signal to aid in the retrieval of the desired signal. One such circuit element commonly used is a capacitor. Capacitors may typically be used between amplifiers in a chain to AC couple the received signal and provide a DC block. The capacitors used are typically single layer high Q producing capacitors which can be expensive relative to the overall system cost, especially for high frequency operation. In addition, the capacitors are often inconsistently manufactured due to different manufacturing process tolerances. In systems requiring increased sensitivity, such as in high frequency receivers, this inconsistency in operation leads to a heightened level of unacceptable performance unpredictability. Instead of using capacitors for coupling, some receivers may use "couplers," which are less expensive to manufacture and which provide a higher performance at RF and millimeter wave frequencies.

Typical couplers which may be used may be positioned between the successive amplifiers in the amplifier chain. One such coupler found in the prior art is the microstrip quarter wave coupler. The microstrip quarter wave coupler typically only has one or two ground plane with a conductor supported by a layer of dielectric.

Using microstrip couplers, however, is problematic because the width and gap between the coupling lines can be less than five mils. The width and gap are determined by the bandwidth, coupling, directivity, and impedance of the application. Additionally, there is a cost production issue associated with fabricating boards with controlled impedance lines of the fine spacing and width required in microstrip couplers.

Another coupler which is widely used is the stripline broadside coupler. The stripline broadside coupler uses the broadside of flat conductors to effect the signal coupling. Typically, such conductors are a quarter wave length long. The broadside couplers are typically preferred since the broadside coupler has two ground planes and homogeneous dielectric which promotes transverse electromagnetic mode (TEM) propagation. In addition, the even and odd phase velocities of the propagating waves are identical, which gives good bandwidth, directivity and voltage standing wave ratio (VSWR).

However, using stripline couplers has its disadvantageous. First, the stripline coupler typically has a higher insertion loss that the microstrip coupler. Second, the stripline coupler requires at least a four layer board (e.g., 4 metal layers, and 3 dielectric layers) and therefore is more costly to produce than a conventional two layer coupler (e.g., 2 metal layers and 1 dielectric layer). In addition, to control the impedances on the stripline coupler at RF and microwave frequencies is extremely difficult and cost prohibitive.

Consequently, a low loss receiver is needed which significantly improves the noise performance of a receiver system. Such a receiver may use a substrate with lower insertion loss than the prior art, and may additionally exclude the use of costly high Q capacitors, which may save time and money in the manufacturing process.

SUMMARY OF THE INVENTION

Generally, a low loss high frequency transmission system according to various aspects of the present invention includes an improved input noise match circuit and an improved interstage noise match circuit. An input noise match circuit and an interstage matching circuit in accordance with the present invention uses a suspended substrate, which has significantly lower insertion loss than any other planar transmission lines found in the prior art. By using a suspended substrate in accordance with the present invention, maximum performance from the first stage LNA is achieved. In particular, the present invention uses an input match stage and an interstage matching circuit with a free space substrate. Accordingly, the present invention use a smaller less expensive antenna, has a lower bit error rate or higher order constellations for digital communication, and provides continued service during inclement weather (e.g., rain, snow, fog, sleet, etc.).

As described more fully below, the present invention uses a suspended substrate circuit element input matching and a suspended substrate stripline broadside coupler which performs the function of a DC block in the interstage match between the first and second LNA. By using a suspended substrate in the input match, the present invention provides the least amount of signal loss since the system presents minimal resistance to signal flow. By using a suspended stripline substrate in the interstage match, the interstage match virtually eliminates any downstream noise contribution by the $1^{st}$ LNA to the overall noise factor (NF).

In one exemplary embodiment, the system uses as an input noise match circuit a suspended substrate circuit. Since as noted, in conventional noise match circuits, there is significant loss in the power of the signal due to the dissipation factor of the substrate used, the present invention provides performance advantages over the prior art due to the effective dissipation factor associated with a suspended substrate circuit. In particular, it is known that the dissipation factor of a suspended substrate circuit rests between the loss tangent of free space and the laminate used in the circuit. Further, because the electric characteristics of the suspended substrate circuit is dominated by free space, then the suspended substrate dissipation factor is closer to that of free space. Free space has a loss tangent of zero. Thus, the dissipation factor of the suspended substrate circuit will be somewhere near zero.

In another exemplary embodiment, a quarter wave broadside coupler is disclosed again using a suspended substrate. The suspended substrate coupler may be used in an interstage noise match circuit. The use of the suspended stripline broadside coupler in the interstage noise match lowers the cost over conventional coupler systems by eliminating the single layer capacitor commonly found in receiver systems. In addition, since no single layer capacitor is required, the present invention eliminates the manufacturing step required to place the capacitor thereby lower the cost of the overall receiver system.

In yet another exemplary embodiment, an interstage noise match block is disclosed which includes the aforementioned suspended substrate coupler and additionally includes an interstage noise match circuit. The interstage noise match circuit may be of similar construction as the input stage circuit described above. Thus, when used in combination with the suspended substrate coupler, the overall performance of the interstage noise match block is improved above the prior art.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings:

FIG. 1 illustrates a block diagram of an exemplary embodiment of a front end high frequency receiver using a suspended substrate input noise match circuit in accordance with the present invention;

FIG. 2 is a perspective view of an exemplary prior art noise match circuit which may be used in high frequency transmission;

FIG. 3 is a perspective view of an exemplary input noise match circuit in accordance with the present invention;

DETAILED DESCRIPTION

Figure 4:
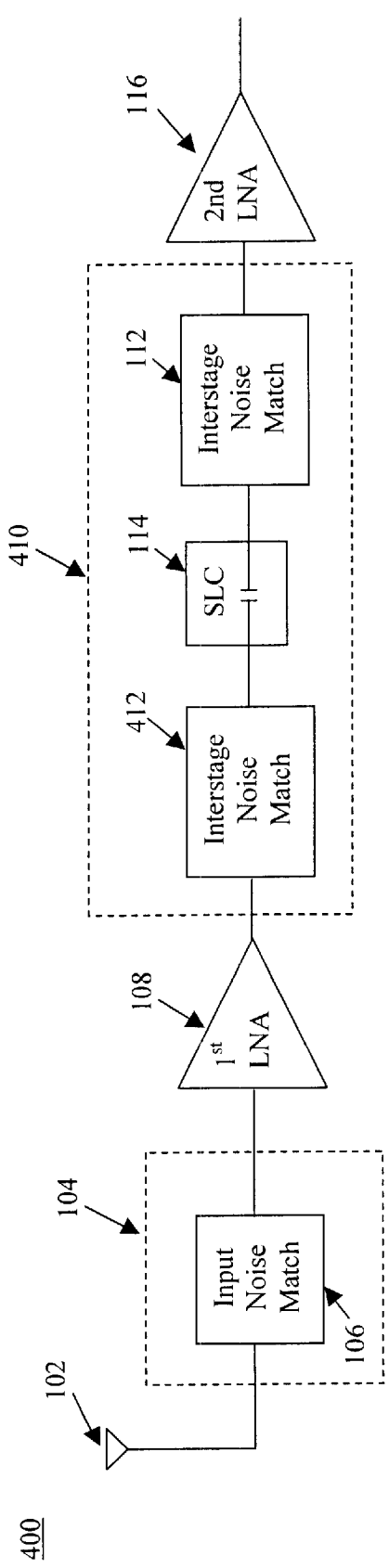
FIG. 4 illustrates a block diagram of another exemplary embodiment of a front end high frequency receiver using a suspended substrate input noise match broadside coupler in accordance with the present invention.

The subject matter of the invention is particularly suited for use in connection with complex mechanical and electrical systems employing high frequency radio communications. As a result, the preferred exemplary embodiment of the present invention is described in that context. It should be recognized, however, that such description is not intended as a limitation on the use or applicability of the present invention, but instead the description is provided merely to enable a full and complete description of a preferred embodiment. Further, although the present invention is described with respect to a receiver, it should be understood that the invention includes receivers, transceivers, transmitters, and any such system wherein it may be necessary to receive or transmit a high frequency signal.

FIG. 1 illustrates a front end receiver system 100 according to various aspects of the invention. System 100 includes an antenna 102 for receiving a high frequency radio signal, and an input noise match block 104 for impedance matching the signal prior to the signal being amplified by a first low noise amplifier (LNA) 108. LNA 108 is coupled to an interstage noise match block 110, which is further connected to a second LNA 116.

Antenna 102 may be any antenna as is found in high frequency receiver units. Indeed, although the present invention is described with respect to an antenna input, it is to be understood that the invention is equally applicable to any system receiving or transmitting high frequency signals. A typical amplifier in accordance with the present invention may be configured to receive a high frequency radio signal and convert the signal into an electrical signal for amplification by a low noise amplifier. Further, first LNA 108 and second LNA 116 may be any suitable low noise amplifiers as is found in the prior art. Suitable low noise amplifiers for use with the present invention may be any amplifier configured for amplification of weak electrical signals as are provided by antenna 102. By way of example, a typical amplifier for use with the invention may be integrated as a monolithic application specific integrated circuit (e.g., MMICS LNAs) or discrete low noise FETs.

Further still, the single layer capacitor 114 may be of any conventional capacitor configured for operation with a microstrip interstage for DC block. Such capacitors typically may be broadband capacitors requiring wirebonding. Typical single layer capacitors for use with a microstrip interstage for DC block are well known, and as such, will not be discussed herein for brevity.

As noted, amplifiers in front end receivers typically increase the noise level in a signal during amplification. Further, antennas may pick up various environmental noise during reception of the high frequency signal. Input noise match circuits are traditionally designed to impedance match the amplifier signal such that the system noise is minimized.

As is well known, the input noise match circuit is an impedance transformer. That is, the input noise match circuit converts the system impedance typically from about 50 Ohms to the optimal source impedance (Γopt). Γopt is the input impedance where the amplifier noise is minimized.

FIG. 2 illustrates an exemplary prior art input noise match circuit 200. Input noise match circuit 200 includes a ground plates 202, a conductor 204 and a substrate 206 in between the ground plate 202 and conductor 204 components. In the prior art noise match circuit 200 depicted, the substrate 206 may be silicon, or plastic, ceramic/glass, epoxy, or the like as is commonly found in the prior art noise match circuits (e.g., microstrip, conventional stripline, etc.). As noted however, the transmission impedance and the insertion loss of the prior art noise match circuit is due mainly to the dissipation factor of the substrate. Thus, a receiver using the prior art input matching circuit will experience some loss attendant to the substrate chosen.

FIG. 3 illustrates an exemplary embodiment of a suspended substrate noise match circuit 106 in accordance with the present invention. As shown, the input noise match circuit is a suspended substrate in that the substrate 306 is suspended between the conductor 304 and the bottom ground plate 302. Substrate 306 may be of similar composition as substrates described above with respect to the prior art. Interposed between the bottom ground plate 302 and the substrate 306 is free space 308, which dominates the transmission pathway of the noise match circuit 106.

By suspended substrate what is meant may mean that the electric and magnetic fields predominately travel in air (e.g., free space). Thus, the electrical performance of the circuit 106 is dominated by free space, which is an optimal RF/microwave transmission medium. Since free space 308 has a dissipation factor near zero, the received signal is permitted to propagate through the input noise match circuit 106 essentially unimpeded. Thus, the circuit 106 operates to minimize the insertion loss when used in the receiver circuit 100, thereby maximizing the performance of the first LNA 108.

As previously noted, the noise of the first stage of the amplifier chain dominates the noise factor of the overall receiver circuit since the noise of the first stage may be amplified by the subsequent amplifier stages. Consequently, since the noise of the first stage using the input matching circuit 106 in accordance with the present invention minimizes the noise, then the noise factor of the system 100 and the overall performance of the system 100 is improved. Accordingly, the transmission performance and insertion loss of the present invention is improved over prior art microstrip, stripline, and coplanar waveguide matching circuits since the transmission of the signal in the prior art circuits is dominated by a dielectric which limits their performance by the dielectric's electrical characteristics.

Returning now to FIG. 1, the signal provided by the $1^{st}$ LNA 108 may be received by the interstage noise match block 110. Interstage noise match block 110 may impedance match the signal and provide a DC block.

The interstage noise match block 110 may further include an interstage noise match circuit 112 for further noise matching, increasing overall system 100 performance. That is, even though the input noise match circuit 106 is implemented with suspended substrate, the performance of the front end receiver may be improved with additional noise matching, although not required. Additional noise matching may be performed in the subsequent stages of the front end receiver to minimize the insertion loss and the noise experienced by any successive amplification stage. More particularly, any loss experienced at the first LNA directly adds to the noise figure of the overall system. Consequently, a front end receiver using additional noise match may improve the insertion loss thereby improving overall receiver performance.

As shown with respect to interstage noise match block 110, the additional noise matching may be performed subsequent (or following) receipt of the signal by capacitor 114. In this instance the interstage noise match block 110 includes interstage noise match circuit 112. Interstage noise match circuit 112 may be of similar construction as input noise match circuit 104. That is, interstage noise match circuit 112 may be a suspended substrate noise matching circuit. Thus, the performance and insertion loss of the receiver 100 may be further improved since the signal provided by capacitor 114 may travel relatively unimpeded through interstage noise match circuit 112 prior to being available to the second LNA 116 for amplification.

FIG. 4 illustrates an exemplary front end receiver 400 in accordance with the present invention including additional interstage noise matching. In particular, the interstage noise matching block 410 includes an optional interstage noise match circuit 412 of similar description and operation as interstage noise match circuit 112, and input noise match circuit 106. Interstage noise match circuit 412 may receive the amplified signal from first LNA 108 and impedance match the signal prior to receipt of the signal by the single layer capacitor 114. In this way, the signal undergoes an additional impedance matching during the interstage noise match process. The result is that the loss between the first and second LNAs is improved and the downstream noise of the receiver 400 contributes less to the overall receiver 400 noise factor.

It should be understood that although FIG. 4 depicts an interstage noise matching as performed by a single interstage noise matching block, the invention is not so limited. Indeed, certain high frequency transmission arrangements may require that the interstage noise matching be performed in two or more individual interstage noise matching blocks depending on the size constraints and the device in which the receiver is used. In this case, each individual noise matching block may employ one or more interstage noise matching circuits as desired, where each interstage noise matching circuit is of similar configuration as circuits 112 and 412 described above.

As noted, the interstage noise match block 410 includes a single layer capacitor 114 which may be subject to inconsistent manufacturing results do to manufacturing tolerances. That is, the actual performance from one single layer capacitor to another may vary from capacitor to capacitor and from manufacturer to manufacturer. Additionally, including the single layer capacitor 114 into the interstage noise match block 410 requires that one plate of the capacitor be accurately placed (e.g., soldered or epoxied) to a RF trace, and the other plate of the capacitor to be wire bonded to a separate RF trace. The affixing of the capacitor to the RF trace in this manner introduces an additional variability into the front end receiver, which reduces system predictability and production yield. Thus, a front end receiver which eliminates the need for the single layer capacitor, and the step of affixing the capacitor, will eliminate the cost associated therefore.

Figure 5:
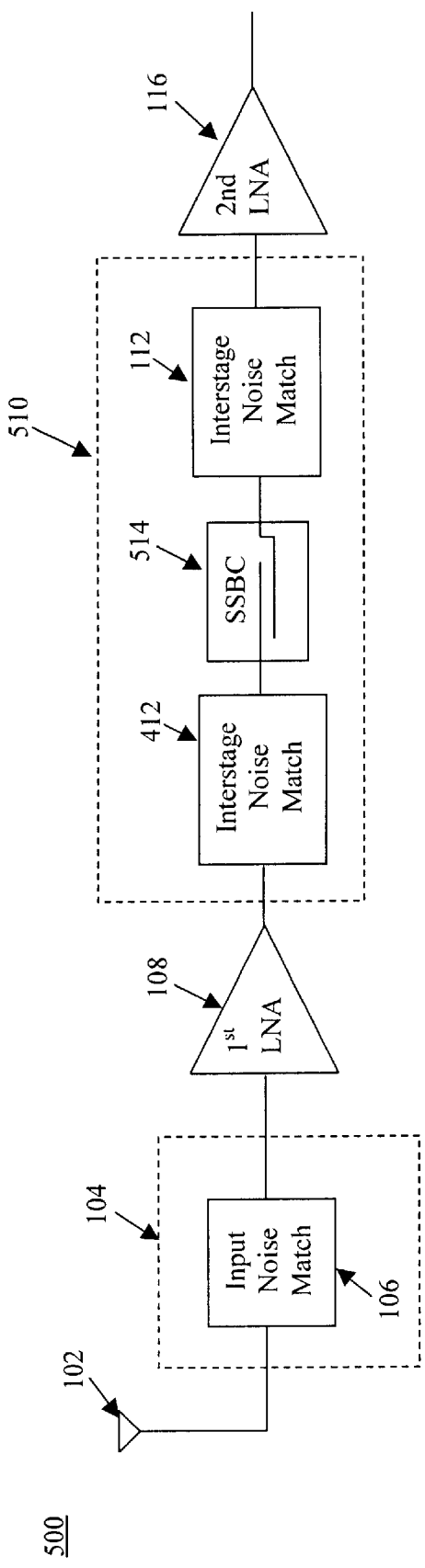
FIG. 5 illustrates a block diagram of another exemplary embodiment of a front end high frequency receiver using a suspended substrate broadside coupler in accordance with the present invention.
Figure 6A:
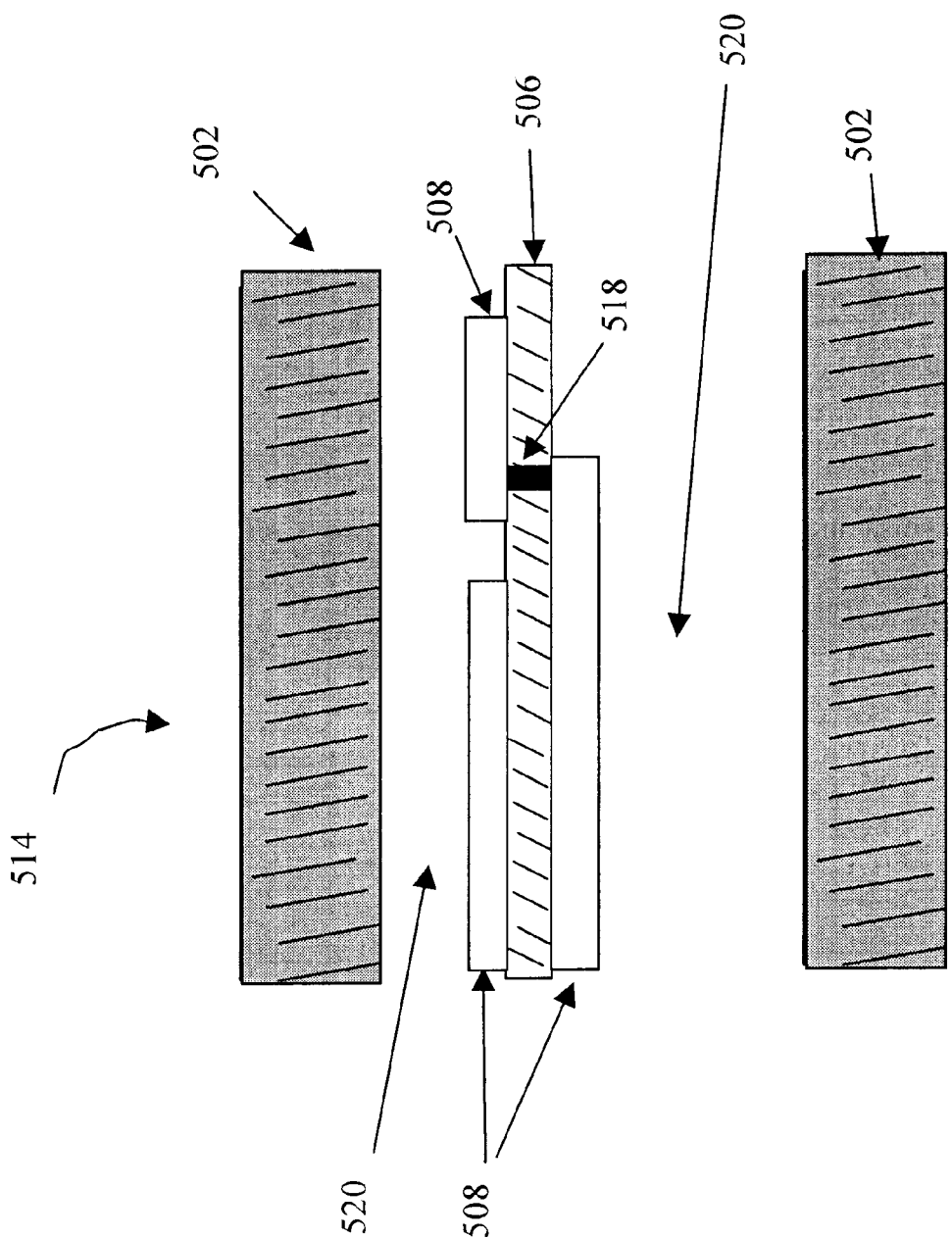
FIG. 6A depicts a side view, in cross-section, of a suspended substrate broadside coupler in accordance with an exemplary embodiment of the present invention.
Figure 6B:
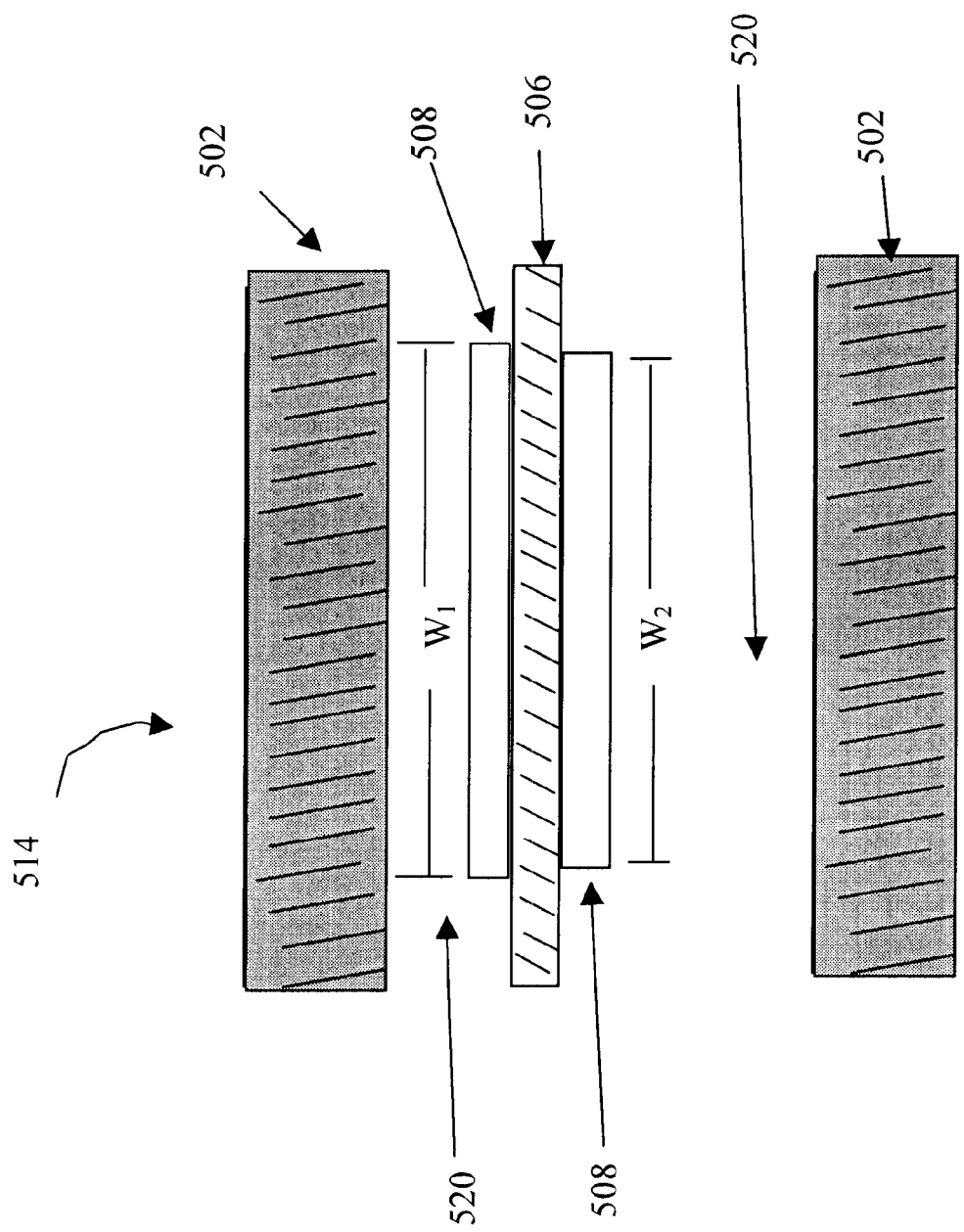
FIG. 6B depicts a forward (or rearward) view, in cross-section, of a suspended substrate broadside coupler in accordance with an exemplary embodiment of the present invention.

FIG. 5 illustrates a front end receiver system 500 in accordance with an exemplary embodiment of the invention, wherein the front end receiver 500 excludes the use of the capacitor in favor of a suspended substrate broadside coupler 514. In one exemplary embodiment, the suspended broadside coupler 514 may be a suspended stripline broadside coupler. FIGS. 6A-B depict an exemplary suspended stripline broadside coupler 514 in accordance with the present invention.

With reference to FIG. 6A, the side view of the suspended broadside coupler 514 is depicted in cross-section. Suspended substrate broadside coupler 514 includes a ground plates 502, and metallization layers 508 connected by a via 518. Interposed between the metallization layers is a suspended substrate 506, wherein the suspended substrate may be of similar composition as substrate 306. Between bottom metallization layer 508 and bottom ground 502, and top metallization layer 508 and top ground 502 is free space 520. In this configuration, the suspended coupler may be termed a suspended broadside coupler, and the free space dominates the signal transmission path in similar manner as was described with respect to input noise math circuit 106.

FIG. 6B shows in cross-section a forward (or rearward) view of the coupler 514. As shown, the metallization layers (e.g., conductors) 508 may comprise a top conductor 508 of width W1 and a bottom conductor 508 of width W2. By differing the widths of the top conductor 508 and the bottom conductor 508, the coupler 514 is less sensitive to misalignment and etching tolerances during manufacturing. Further still, the widths of conductors 512,516 may be optimized to tune out any parasitics associated with via 518 (best seen in FIG. 6A).

The suspended substrate stripline broadside coupler 514 configured thusly provides a DC block between the first LNA 108 and the second LNA 116, and helps to stabilize the front end receiver system 500 from oscillation by substantially eliminating out of band gain. The coupler 514 eliminates the out of band gain since its frequency response is similar to that of a band pass filter. In addition, coupler 514 may provide some filtering since the coupler 514 is only a quarter wave coupler at the design frequency. A quarter wave coupler provides rejection every frequency outside the design frequency. It should be understood then that the suspended substrate for the broadside coupler 514 performs a DC block, preventing any DC signals to pass to the subsequent receiver stages.

Figure 7:
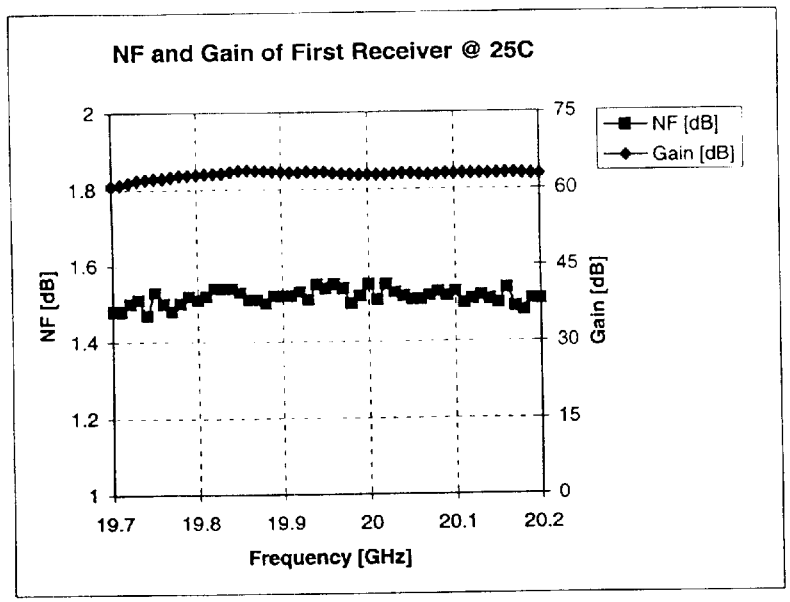
FIG. 7 is a graphical representation of a frequency response of a front end receiver using suspended substrate matching circuits and a single layer capacitor in accordance with an exemplary embodiment of the present invention.
Figure 8:
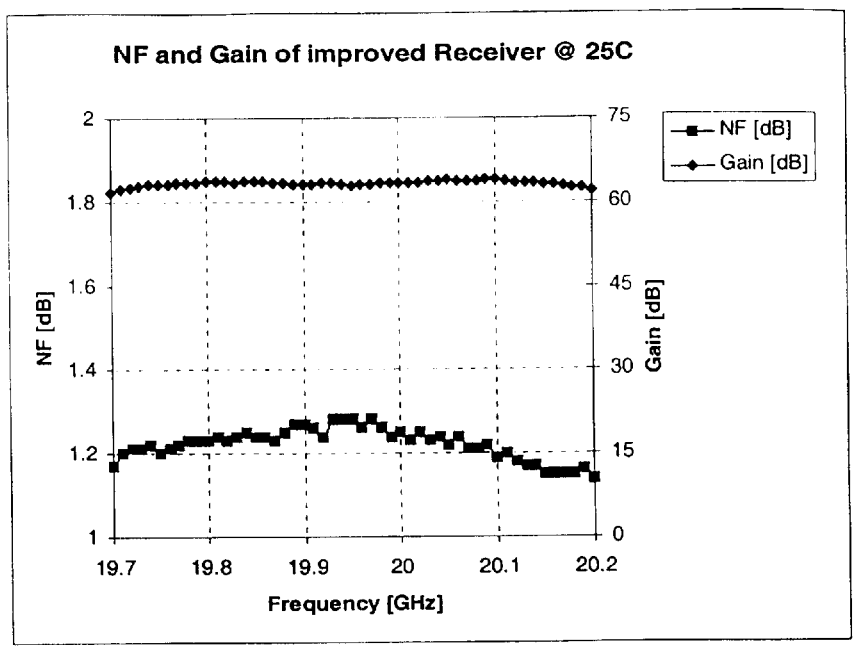
FIG. 8 is a graphical representation of a frequency response of a front end receiver using suspended substrate matching circuits and a suspended substrate broadside coupler in accordance with an exemplary embodiment of the present invention.

FIGS. 7 and 8 depict measured performances of exemplary front end receivers 400 and 500 respectively, formed in accordance with the present invention. FIGS. 7 and 8 are merely illustrative and therefore are intended to demonstrate by way of example the improved performance of the present invention over the prior art.

With respect to FIG. 7, what is depicted is the measured performance of the exemplary front end receiver system 400 of FIG. 4, where the targeted noise factor is 1.4 dB. In particular, FIG. 7 illustrates that, at ambient temperature (e.g. 25° C.)–the noise factor (NF) for system 300 at 25° C. is about 1.45–1.5 dB at a gain of 60 dB. FIG. 7 illustrates that system 300 has a NF improvement of approximately 0.5 to 0.8 dB over the prior art.

Even though the system 400 shows an improved response over the prior art, FIG. 8 illustrates that the performance of the front end receiver may be further improved through the use of a suspended stripline broadside coupler, such as that used in exemplary front end receiver 500 depicted above. As shown, in FIG. 8, at a temperature of 25° C., the system 400 may have a NF performance of about 1.19–1.25 dB, thereby achieving higher RF electrical yield above the prior art and system 300. The NF of 1.25 dB maximum falls comfortably within the 1.4 dB target. In addition, the system 400 using the suspended substrate coupler 414 is able to achieve the targeted NF while reducing production cost by eliminating the manufacturing step required to place a single layer capacitor.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented.

What is claimed is:

1. A high frequency transmission system comprising:
   (a) an input noise match block including a suspended substrate input noise match circuit for receiving a high frequency signal, said input noise match circuit for input noise matching said high frequency signal, said input noise match circuit comprising by:
      1) a first ground plate,
      2) a second ground plate,
      3) conductor interposed between said first and second ground plate,
      4) a substrate in communication with said conductor, said substrate interposed between said conductor and said second ground plate, and
      5) free space interposed between said substrate and second ground plate; and
   (b) a first amplifier circuit for receiving said high frequency signal, said first amplifier for amplifying said high frequency signal producing an amplified high frequency signal, said first amplifier in communication with said input noise match block.

2. A system according to claim 1, further comprising:
   (a) an interstage block for receiving said amplified high frequency signal, said interstage block including a suspended substrate stripline coupler, said suspended substrate stripline coupler for providing a DC block, said suspended substrate stripline coupler comprising:

1) a first coupler ground plate,
2) a second coupler ground plate,
3) a first coupler conductor interposed between said first and second coupler ground plate,
4) a second coupler conductor interposed between said first coupler conductor and second coupler ground plate,
5) a coupler substrate interposed between said first and second coupler conductor, said coupler substrate in communication with said first and second coupler conductor;
6) a via positioned in said coupler substrate, said via in communication with said first and second coupler conductor, and
7) a free space interposed between said second coupler conductor and said second coupler ground plate.

3. A system according to claim 2, wherein said interstage noise match block further comprises a suspended substrate interstage noise match circuit for receiving a high frequency signal, said suspended substrate interstage noise match circuit for input noise matching said high frequency signal, said suspended substrate interstage noise match circuit comprising by:
1) a third ground plate,
2) a fourth ground plate,
3) a second conductor interposed between said third and fourth ground plate,
4) a second substrate in communication with said second conductor, said second substrate interposed between said second conductor and said fourth ground plate, and
5) a second free space interposed between said second substrate and fourth ground plate.

4. A high frequency transmission system comprising:
(a) a suspended stripline coupler, said suspended stripline coupler for providing a DC block, said stripline coupler comprising:
1) a first coupler ground plate,
2) a second coupler ground plate,
3) a first coupler conductor interposed between said first and second coupler ground plate,
4) a second coupler conductor interposed between said first coupler conductor and second coupler ground plate,
5) a coupler substrate interposed between said first and second coupler conductor, said coupler substrate in communication with said first and second coupler conductor;
6) a via positioned in said coupler substrate, said via in communication with said first and second coupler conductor, and
7) a free space interposed between said second coupler conductor and said second coupler ground plate.

5. A suspended substrate a suspended stripline coupler comprising:
1) a first coupler ground plate,
2) a second coupler ground plate,
3) a first coupler conductor interposed between said first and second coupler ground plate,
4) a second coupler conductor interposed between said first coupler conductor and second coupler ground plate,
5) a coupler substrate interposed between said first and second coupler conductor, said coupler substrate in communication with said first and second coupler conductor;
6) a via positioned in said coupler substrate, said via in communication with said first and second coupler conductor, and
7) a free space interposed between said second coupler conductor and said second coupler ground plate.

6. A method for providing high radio frequency transmission comprising the steps of:
(a) providing a first input matching circuit for receiving an RF signal, the first input matching circuit characterized by:
1) a first ground plate,
2) a second ground plate,
3) conductor interposed between said first and second ground plate,
4) a substrate in communication with said conductor, said substrate interposed between said conductor and said second ground plate, and
5) free space interposed between said substrate and second ground plate; and
(b) providing a first amplifier in communication with said first input matching circuit, said first amplifier for receiving the RF signal and producing an amplified RF signal.

7. A method according to claim 6, further comprising the process of:
(a) providing an interstage block for receiving said amplified high frequency signal, said interstage block including a suspended substrate stripline coupler, said suspended substrate stripline coupler for providing a DC block, said suspended substrate stripline coupler comprising:
1) a first coupler ground plate,
2) a second coupler ground plate,
3) a first coupler conductor interposed between said first and second coupler ground plate,
4) a second coupler conductor interposed between said first coupler conductor and second coupler ground plate,
5) a coupler substrate interposed between said first and second coupler conductor, said coupler substrate in communication with said first and second coupler conductor;
6) a via positioned in said coupler substrate, said via in communication with said first and second coupler conductor, and
7) a free space interposed between said second coupler conductor and said second coupler ground plate.

8. A method for providing a high radio frequency transmission system comprising:
providing a suspended stripline coupler, said suspended stripline coupler for providing a DC block, said sripline coupler comprising:
1) a first coupler ground plate,
2) a second coupler ground plate,
3) a first coupler conductor interposed between said first and second coupler ground plate,
4) a second coupler conductor interposed between said first coupler conductor and second coupler ground plate,
5) a coupler substrate interposed between said first and second coupler conductor, said coupler substrate in communication with said first and second coupler conductor;
6) a via positioned in said coupler substrate, said via in communication with said first and second coupler conductor, and
7) a free space interposed between said second coupler conductor and said second coupler ground plate.

* * * * *